United States Patent
MacKay et al.

(10) Patent No.: US 12,285,783 B2
(45) Date of Patent: Apr. 29, 2025

(54) MONITORING AIR PRESSURE AND FLOW IN A FIBER CLEANING DEVICE

(71) Applicant: VIAVI Solutions Inc., San Jose, CA (US)

(72) Inventors: Gordon MacKay, Seattle, WA (US); Kevin Cassady, Monroe, WA (US); Peter Kriofske, Seattle, WA (US); William Shawn Rosenau, Everett, WA (US); Brad Basler, Everett, WA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 16/884,557

(22) Filed: May 27, 2020

(65) Prior Publication Data

US 2021/0370359 A1    Dec. 2, 2021

(51) Int. Cl.
*B08B 5/02*    (2006.01)
*B08B 3/08*    (2006.01)
(Continued)

(52) U.S. Cl.
CPC .................. *B08B 5/02* (2013.01); *B08B 3/08* (2013.01); *B08B 5/04* (2013.01); *B08B 13/00* (2013.01); *G01N 15/0826* (2013.01); *G02B 6/3866* (2013.01); *B08B 2240/02* (2013.01); *G01N 2015/084* (2013.01)

(58) Field of Classification Search
CPC .... H05K 3/26; H05K 2203/0783; B08B 3/10; B08B 3/02; B08B 5/02; B08B 3/08; B08B 5/04; B08B 13/00; B08B 2240/02; G01N 15/0826; G01N 2015/084; G02B 6/3866
See application file for complete search history.

(56) References Cited

U.S. PATENT DOCUMENTS 5,836,031 A * 11/1998 Cox ...................... G02B 6/3829
                                                        15/104.002
5,906,686 A *  5/1999 McNeil ................. C11D 11/007
                                                        134/1
(Continued)

FOREIGN PATENT DOCUMENTS

CN             1682235 A      10/2005
CN           101109470 A       1/2008
WO    WO-2017046770 A1 *  3/2017    ............... B08B 3/12

OTHER PUBLICATIONS

Extended European Search Report for Application No. EP21175176.3, mailed on Oct. 21, 2021, 8 pages.

*Primary Examiner* — Alexander Markoff
(74) *Attorney, Agent, or Firm* — Harrity & Harrity, LLP

(57) ABSTRACT

A device for cleaning an end face of an optical fiber may receive a first pressure signal from a first pressure sensor, wherein the device includes a pneumatic circuit, wherein the pneumatic circuit includes: one or more circuit components, the first pressure sensor, and a second pressure sensor. The device may receive a second pressure signal from the second pressure sensor. The device may determine, based on the first pressure signal and the second pressure signal, whether a pressure difference across a circuit component, of the one or more circuit components, satisfies a threshold. The device may perform, based on the pressure difference across the circuit component not satisfying the threshold, one or more actions.

20 Claims, 4 Drawing Sheets

(51) Int. Cl.
*B08B 5/04* (2006.01)
*B08B 13/00* (2006.01)
*G01N 15/08* (2006.01)
*G02B 6/38* (2006.01)

(56) References Cited

U.S. PATENT DOCUMENTS

| | | | |
|---|---|---|---|
| 6,676,763 B2* | 1/2004 | Johnson, III | G02B 6/25 134/1 |
| 7,292,945 B2 | 11/2007 | Wargo et al. | |
| 7,543,596 B2 | 6/2009 | Laverdiere et al. | |
| 9,891,389 B1* | 2/2018 | Fredell | B08B 3/04 |
| 2001/0033728 A1* | 10/2001 | Miyake | G02B 6/3807 385/134 |
| 2002/0108636 A1* | 8/2002 | Childers | G02B 6/3807 134/6 |
| 2002/0131748 A1* | 9/2002 | Sato | G02B 6/3866 385/134 |
| 2002/0166190 A1* | 11/2002 | Miyake | G02B 6/385 15/210.1 |
| 2003/0007774 A1* | 1/2003 | Christopher | G02B 6/245 385/147 |
| 2003/0221706 A1* | 12/2003 | Kiani | B08B 3/02 134/6 |
| 2003/0221710 A1* | 12/2003 | Young | G02B 6/381 134/22.14 |
| 2004/0005134 A1* | 1/2004 | Sun | G02B 6/3866 385/134 |
| 2004/0013370 A1* | 1/2004 | Gerhard | B08B 11/02 385/85 |
| 2004/0033050 A1* | 2/2004 | Lytle | B08B 3/02 385/147 |
| 2004/0086232 A1* | 5/2004 | Fujiwara | B08B 11/00 385/53 |
| 2005/0286852 A1* | 12/2005 | Juergen | B08B 5/02 385/134 |
| 2005/0286853 A1* | 12/2005 | Fujiwara | B08B 1/008 385/134 |
| 2006/0171641 A1* | 8/2006 | Zhang | B08B 5/02 385/85 |
| 2008/0028567 A1 | 2/2008 | Hackert | |
| 2011/0072600 A1* | 3/2011 | Nakane | G02B 6/3807 15/97.1 |
| 2012/0323377 A1* | 12/2012 | Hoglund | F24F 11/52 700/277 |
| 2014/0209179 A1 | 7/2014 | Maier et al. | |
| 2015/0029495 A1* | 1/2015 | Leigh | G02B 6/3866 356/73.1 |
| 2015/0330857 A1* | 11/2015 | Henderson | G01N 15/0826 702/41 |
| 2016/0377810 A1* | 12/2016 | Lee | G02B 6/25 134/10 |
| 2018/0128993 A1* | 5/2018 | Brown | B08B 5/02 |
| 2020/0030149 A1 | 1/2020 | Zhou | |
| 2021/0072483 A1* | 3/2021 | Kewitsch | G02B 6/356 |

\* cited by examiner

MONITORING AIR PRESSURE AND FLOW IN A FIBER CLEANING DEVICE

BACKGROUND

Contaminants, such as dust, dirt, oil, and/or the like, on an end face of an optical fiber connector can negatively impact network performance by increasing signal loss and damaging the optical fiber. As bandwidth demands rise and signal loss budgets become tighter, the ability to inspect and clean end faces of optical fibers before connecting has become critical.

SUMMARY

According to some implementations, a method may include receiving, by a device for cleaning an end face of an optical fiber, a first pressure signal from a first pressure sensor, wherein the device includes a pneumatic circuit, wherein the pneumatic circuit includes a pressure supply port for receiving an input air flow, a pressure output port for providing an output air flow for cleaning the end face of the optical fiber, one or more circuit components, the first pressure sensor, and a second pressure sensor; receiving, by the device, a second pressure signal from the second pressure sensor; determining, by the device and based on the first pressure signal and the second pressure signal, whether a pressure difference across a circuit component, of the one or more circuit components, satisfies a threshold; and performing, by the device and based on the pressure difference across the circuit component not satisfying the threshold, one or more actions, wherein the one or more actions include causing a message to be displayed to a user, causing one or more valves in the pneumatic circuit to close, causing the one or more valves in the pneumatic circuit to open, and causing a pressure regulator in the pneumatic circuit to be adjusted.

According to some implementations, a method may include receiving, by a device for cleaning an end face of an optical fiber, a pressure signal from a pressure sensor, wherein the device includes a pneumatic circuit, wherein the pneumatic circuit includes a pressure supply port for receiving an input air flow, a pressure output port for providing an output air flow for cleaning the end face of the optical fiber, one or more circuit components, and the pressure sensor, wherein the pressure sensor is positioned, in the pneumatic circuit, between the pressure supply port and at least one circuit component of the one or more circuit components; determining, by the device and based on the pressure signal, whether the input air flow satisfies a threshold; and performing, by the device and based on the input air flow not satisfying the threshold, one or more actions, wherein the one or more actions include causing a message to be displayed to a user, causing one or more valves in the pneumatic circuit to close, causing the one or more valves in the pneumatic circuit to open, and causing a pressure regulator in the pneumatic circuit to be adjusted.

According to some implementations, a device for cleaning an end face of an optical fiber may include a pneumatic circuit including a pressure supply port for receiving an input air flow, a pressure output port for providing an output air flow for cleaning the end face of the optical fiber, a circuit component, a first pressure sensor for generating a first pressure signal, wherein the first pressure sensor is positioned between the pressure supply port and the circuit component, and a second pressure sensor for generating a second pressure signal; and one or more processors configured to receive the first pressure signal, receive the second pressure signal, determine, based on the first pressure signal, whether the input air flow satisfies a first threshold, determine, based on the first pressure signal and the second pressure signal, whether a pressure difference across the circuit component satisfies a second threshold, perform, based on at least one of the input air flow not satisfying the first threshold or the pressure difference across the circuit component not satisfying the second threshold, one or more actions, wherein the one or more actions include causing a message to be displayed to a user, causing one or more valves in the pneumatic circuit to close, causing the one or more valves in the pneumatic circuit to open, and causing a pressure regulator in the pneumatic circuit to be adjusted.

DETAILED DESCRIPTION

Figure 1:
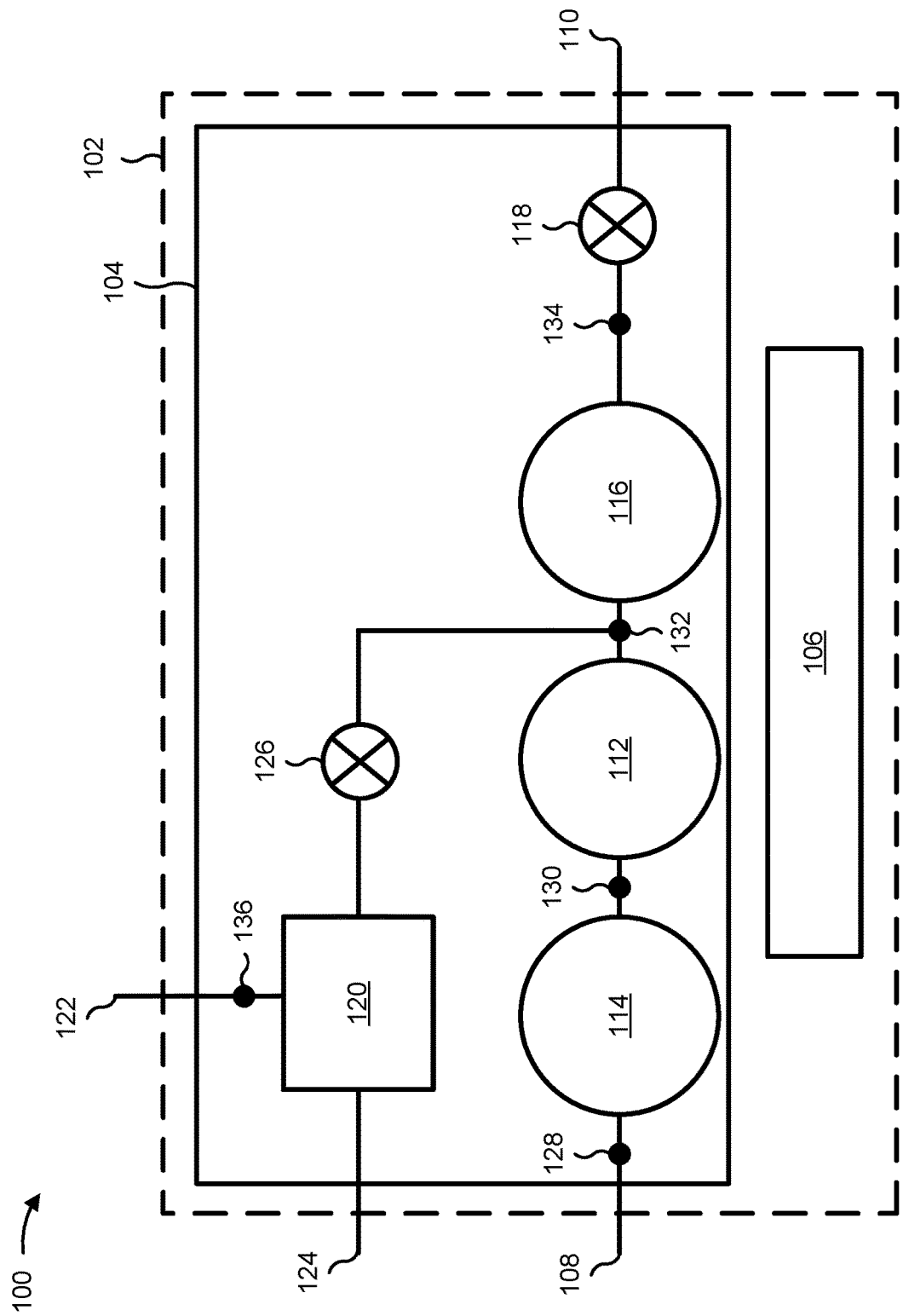
FIG. 1 is a diagram of an example implementation of a fiber cleaning device including a pneumatic circuit for monitoring air pressure and flow described herein.

The following detailed description of example implementations refers to the accompanying drawings. The same reference numbers in different drawings may identify the same or similar elements.

Fiber cleaning devices may include a bench-top assembly and a handset connected to the bench-top assembly (e.g., via an umbilical cord and/or the like). The bench-top assembly may include a solvent tank for holding solvent used to clean end faces of optical fibers, a pneumatic circuit, a controller, a display, and one or more user-input mechanisms (e.g., buttons, knobs, switches, and/or the like). The pneumatic circuit may be connected via a pressure supply port to a user-provided compressed air supply. The pneumatic circuit may include a vacuum generator that uses air flow from the compressed air supply to generate a vacuum at a vacuum port. The pneumatic circuit may also use the compressed air flow to provide a pressurized air flow at a pressure output port. The handset may receive, via the umbilical cord, vacuum from the vacuum port, pressurized air flow from the pressure port, and solvent from the solvent tank. A user may manipulate the handset to use the vacuum, pressurized air, and solvent to clean end faces of optical fibers.

In addition to the pressure supply port, the vacuum generator, the vacuum port, and the pressure output port, the pneumatic circuit may include other circuit components, such as a pressure regulator, air filters, valves, and/or the like. One or more of the air filters may become dirty, clogged, and/or the like over time and prevent the pneumatic circuit from providing a sufficient pressure and/or volumetric flow of pressurized air to the pressure output port. A dirty and/or clogged filter may also prevent the vacuum generator from generating a sufficient vacuum via the vacuum port. Additionally, or alternatively, one or more of the circuit components, such as the regulator, the vacuum generator, or the valves within the pneumatic assembly, may fail and prevent the device from functioning properly. Furthermore, the customer-provided compressed air supply may not be supplying a sufficient pressure and/or volumetric flow of air to the pressure supply port. When an air filter becomes dirty and/or clogged or a circuit component fails, a user must detect that the fiber cleaning device is not working properly, and either attempt to troubleshoot the problem without any knowledge of the cause of the problem or ship the device to a repair shop, which must then troubleshoot the problem without any knowledge of the cause of the problem.

Some implementations described herein provide a fiber cleaning device and/or a method performed by a fiber cleaning device that include receiving pressure signals from pressure sensors positioned in the pneumatic circuit. In some implementations, the fiber cleaning device and/or the method may, using the sensors, detect pressure differences across circuit components, and may notify the user and/or take other actions (e.g., close valves, adjust a pressure regulator, and/or the like). For example, the fiber cleaning device may detect if an air filter is becoming dirty and/or clogged and may provide a message to the user indicating that an air filter is dirty and/or clogged and which air filter in the system is dirty and/or clogged.

Additionally, or alternatively, the fiber cleaning device and/or the method may, using the sensors, detect whether the customer-provided compressed air supply is insufficient and notify the user and/or take other actions. In this way, the fiber cleaning device and/or the method may detect problems in the pneumatic circuit, control the pneumatic circuit to prevent further problems and/or damage to the pneumatic circuit, and/or provide messages to a user regarding the problems in the pneumatic circuit. Furthermore, the messages may prevent the user from performing ineffective maintenance on the fiber cleaning device, such as replacing an air filter when the customer-provided compressed air supply is insufficient and/or a circuit component other than the air filter is not working properly.

FIG. 1 is a diagram of an example implementation 100 of a fiber cleaning device 102 including a pneumatic circuit 104 for monitoring air pressure and flow described herein. As shown in FIG. 1, the fiber cleaning device 102 may include the pneumatic circuit 104, a controller 106, a pressure supply port 108, a pressure output port 110, a pressure regulator 112, an input air filter 114, an output air filter 116, an output valve 118, a vacuum generator 120, a vacuum port 122, an exhaust port 124, a vacuum control valve 126, a supply pressure sensor 128, an input pressure sensor 130, an internal pressure sensor 132, an output pressure sensor 134, and a vacuum pressure sensor 136.

In some implementations, and as shown in FIG. 1, the pneumatic circuit 104 may include the pressure supply port 108, the pressure output port 110, the pressure regulator 112, the input air filter 114, the output air filter 116, the output valve 118, the vacuum generator 120, the vacuum port 122, the exhaust port 124, the vacuum control valve 126, the supply pressure sensor 128, the input pressure sensor 130, the internal pressure sensor 132, the output pressure sensor 134, and the vacuum pressure sensor 136. The fiber cleaning device 102 and/or the pneumatic circuit 104 may receive air flow from a compressed air supply through the pressure supply port 108 and use the air flow to provide a pressurized air flow at the pressure output port 110, a vacuum at the vacuum port 122 (e.g., via the vacuum generator 120), and output exhaust (e.g., from the vacuum generator 120) at the exhaust port 124.

In some implementations, during an optical fiber end face cleaning process, a user may operate the fiber cleaning device 102 to use pressurized air flow from the pressure output port 110, vacuum from the vacuum port 122, and/or solvent from a solvent tank in the fiber cleaning device 102 to clean an end face of an optical fiber. For example, the fiber cleaning device 102 may include a handset connected, via an umbilical cord, to the pressure output port 110, the vacuum port 122, and/or the solvent tank, and the user may manipulate the handset (e.g., via a user-input mechanism) to provide pressurized air flow, vacuum, and/or solvent to the end face of the optical fiber. In some implementations, the controller 106 may, based on user manipulation of the handset and/or instructions stored in memory of the controller, control the handset and/or the pneumatic circuit 104 to provide pressurized air, vacuum, and/or solvent (e.g., in a pattern and/or series of steps and/or the like).

As shown in FIG. 1, the supply pressure sensor 128 may be positioned in the pneumatic circuit 104 between the pressure supply port 108 and the input air filter 114. In some implementations, the supply pressure sensor 128 may sense pressure provided, by the compressed air supply, to the pressure supply port 108 and may generate, based on the sensed pressure, a pressure supply signal.

In some implementations, and as shown in FIG. 1, the input air filter 114 may be positioned in the pneumatic circuit 104 between the supply pressure sensor 128 and the input pressure sensor 130. The input air filter 114 may filter air provided by the compressed air supply to the pneumatic circuit 104 to remove contaminants (e.g., dust particles, humidity, and/or the like) that may damage and/or affect performance of the pneumatic circuit 104 and/or the fiber cleaning device 102.

As shown in FIG. 1, the input pressure sensor 130 may be positioned in the pneumatic circuit 104 between the input air filter 114 and the pressure regulator 112. The supply pressure sensor 128 may sense pressure input to the pressure regulator 112 and may generate, based on the sensed pressure, an input pressure signal.

In some implementations, and as shown in FIG. 1, the pressure regulator 112 may be positioned in the pneumatic circuit 104 between the input pressure sensor 130 and the internal pressure sensor 132. The pressure regulator 112 may control the pressure of air flow provided, by the compressed air supply, to the pneumatic circuit 104 to provide a system pressure to the other circuit components (e.g., the output air filter 116, the output valve 118, the vacuum generator 120, the vacuum port 122, the vacuum control valve 126, and/or the like). For example, the pressure regulator 112 may decrease pressure of the air flow provided by the compressed air supply to prevent damage to the other circuit components and/or may increase pressure of the air flow provided by the compressed air supply to ensure that the other circuit components, the pneumatic circuit 104, and/or the fiber cleaning device 102 function properly. In some implementations, the pressure regulator 112 may be adjustable such that the system pressure provided by the pressure regulator 112 may be adjustable.

As shown in FIG. 1, the internal pressure sensor 132 may be positioned in the pneumatic circuit 104 between the pressure regulator 112 and the output air filter 116 and between the pressure regulator 112 and the vacuum control valve 126. The internal pressure sensor 132 may sense pressure provided by the pressure regulator 112 and may generate, based on the sensed pressure, an internal pressure signal.

In some implementations, and as shown in FIG. 1, the output air filter 116 may be positioned in the pneumatic circuit 104 between the internal pressure sensor 132 and the output pressure sensor 134. The output air filter 116 may filter air provided by the pneumatic circuit 104 to an end face of an optical fiber to remove contaminants (e.g., dust particles, humidity, and/or the like) that may damage and/or increase signal loss of the optical fiber, which may negatively impact network performance.

As shown in FIG. 1, the output pressure sensor 134 may be positioned in the pneumatic circuit 104 between the output air filter 116 and the output valve 118. The output pressure sensor 134 may sense pressure provided to the pressure output port 110 and may generate, based on the sensed pressure, an output pressure signal.

In some implementations, and as shown in FIG. 1, the output valve 118 may be positioned in the pneumatic circuit 104 between the output pressure sensor 134 and the pressure output port 110. The output valve 118 may control the flow of pressurized air provided by the pressure output port 110. For example, the controller 106 may cause the output valve 118 to open and/or close (e.g., in a pattern and/or series of steps and/or the like).

As shown in FIG. 1, the vacuum control valve 126 may be positioned in the pneumatic circuit 104 between the internal pressure sensor 132 and the vacuum generator 120. In some implementations, the vacuum control valve 126 may control the flow of pressurized air from the pressure regulator 112 to the vacuum generator 120. For example, the controller 106 may cause the vacuum control valve 126 to open and/or close (e.g., in a pattern and/or series of steps and/or the like).

In some implementations, and as shown in FIG. 1, the vacuum generator 120 may be positioned in the pneumatic circuit 104 between the vacuum control valve 126 and the vacuum pressure sensor 136 and between the vacuum control valve 126 and the exhaust port 124. The vacuum generator 120 may use the flow of pressurized air from the pressure regulator 112 to generate a vacuum at the vacuum port 122 and output exhaust air through the exhaust port 124. In some implementations, the fiber cleaning device 102 may use the vacuum, generated by the vacuum generator 120 at the vacuum port 122, during an optical fiber end face cleaning process.

As shown in FIG. 1, the vacuum pressure sensor 136 may be positioned between the vacuum generator 120 and the vacuum port 122. The vacuum pressure sensor 136 may sense pressure (e.g., a negative pressure) provided, by the vacuum generator 120, at the vacuum port 122 and may generate, based on the sensed pressure, a vacuum pressure signal.

As used herein, the pressure supply signal from the supply pressure sensor 128, the input pressure signal from the input pressure sensor 130, the internal pressure signal from the internal pressure sensor 132, the output pressure signal from the output pressure sensor 134, and/or the vacuum pressure signal from the vacuum pressure sensor 136 may be collectively referred to as the pressure signals. Similarly, the supply pressure sensor 128, the input pressure sensor 130, the internal pressure sensor 132, the output pressure sensor 134, and/or the vacuum pressure sensor 136 may be collectively referred to as the pressure sensors.

As described herein, the controller 106 may be configured to receive one or more of the pressure signals from one or more of the pressure sensors and, based on the one or more pressure signals, determine whether air flows satisfy thresholds, determine whether pressure differences across circuit components satisfy thresholds, and/or perform one or more actions, such as causing messages to be displayed to a user, causing one or more valves to close, causing one or more valves to open, causing the pressure regulator 112 to be adjusted, and/or the like.

In some implementations, the controller may receive a pressure signal, determine, based on the pressure signal, whether an air flow satisfies a threshold, and perform, based on the air flow not satisfying the threshold, one or more actions. For example, the controller 106 may receive the pressure supply signal from the supply pressure sensor 128 and determine, based on the pressure supply signal, whether an input air flow provided to the pressure supply port 108 satisfies a threshold. The controller 106 may perform, based on the input air flow not satisfying a threshold, one or more actions, such as causing a message (e.g., "insufficient input air flow," "check air supply connection," and/or the like) to be displayed to a user, causing the output valve 118 and/or the vacuum control valve 126 to close or open, causing the pressure regulator 112 to be adjusted, and/or the like.

As another example, the controller 106 may receive the output pressure signal from the output pressure sensor 134 and determine, based on the output pressure signal, whether an output air flow satisfies a threshold. The controller 106 may perform, based on the output air flow not satisfying the threshold, one or more actions, such as causing a message (e.g., "insufficient output air flow," "check air filters," and/or the like) to be displayed to a user, causing the output valve 118 and/or the vacuum control valve 126 to close or open, causing the pressure regulator 112 to be adjusted, and/or the like.

In this way, the fiber cleaning device 102, using the controller 106 and the pressure sensors, may monitor (e.g., in real-time) pressure levels within the pneumatic circuit 104 and, when a pressure level does not satisfy a threshold, perform one or more actions to notify the user of a problem, provide the user with information to correct the problem, adjust functioning of the pneumatic circuit 104 (e.g., by opening and/or closing valves, by adjusting the pressure regulator, and/or the like) to correct the problem, to prevent damage to the fiber cleaning device 102, and/or to prevent the fiber cleaning device 102 from damaging an end face of an optical fiber, and/or the like.

In some implementations, the controller may receive a first pressure signal and a second pressure signal, determine, based on the first pressure signal and the second pressure signal, whether a pressure difference across a circuit component satisfies a threshold, and perform, based on the pressure difference across the circuit component not satisfying the threshold, one or more actions. For example, the controller 106 may receive the pressure supply signal from the supply pressure sensor 128 and the input pressure signal from the input pressure sensor 130 and determine, based on the pressure supply signal and the input pressure signal, whether a pressure difference across the input air filter 114 satisfies a threshold. The controller 106 may perform, based on the pressure difference across the input air filter 114 not satisfying the threshold, one or more actions, such as causing a message (e.g., "check input air filter," "input air filter dirty/clogged," "replace input air filter," and/or the like) to be displayed to a user, causing the output valve 118 and/or the vacuum control valve 126 to close or open, causing the pressure regulator 112 to be adjusted, and/or the like.

As another example, the controller 106 may receive the input pressure signal from the input pressure sensor 130 and the internal pressure signal from the internal pressure sensor 132 and determine, based on the input pressure signal and the internal pressure signal, whether a pressure difference across the pressure regulator 112 satisfies a threshold. The controller 106 may perform, based on the pressure difference across the pressure regulator 112 not satisfying the threshold, one or more actions, such as causing a message (e.g., "pressure regulator malfunction," "inspect pressure regulator," "replace pressure regulator," and/or the like) to be displayed to a user, causing the output valve 118 and/or the vacuum control valve 126 to close or open, causing the pressure regulator 112 to be adjusted, and/or the like.

As another example, the controller 106 may cause the vacuum control valve 126 to open and receive the internal pressure signal from the internal pressure sensor 132 and the vacuum pressure signal from the vacuum pressure sensor 136. The controller 106 may determine, based on the internal pressure signal and the vacuum pressure signal, whether a pressure difference across the vacuum generator 120 satisfies a threshold. The controller 106 may perform, based on the pressure difference across the vacuum generator 120 not satisfying the threshold, one or more actions, such as causing a message (e.g., "vacuum generator malfunction," "inspect vacuum generator," "inspect vacuum control valve," "replace vacuum generator," "replace vacuum control valve," and/or the like) to be displayed to a user, causing the output valve 118 and/or the vacuum control valve 126 to close or open, causing the pressure regulator 112 to be adjusted, and/or the like.

In this way, the fiber cleaning device 102, using the controller 106 and the pressure sensors, may monitor (e.g., in real-time) pressure differences across circuit components within the pneumatic circuit 104 and, when a pressure difference does not satisfy a threshold, perform one or more actions to notify the user of a problem, provide the user with information to correct the problem, adjust functioning of the pneumatic circuit 104 (e.g., by opening and/or closing valves, by adjusting the pressure regulator, and/or the like) to correct the problem, to prevent damage to the fiber cleaning device 102, and/or to prevent the fiber cleaning device 102 from damaging an end face of an optical fiber, and/or the like. For example, the fiber cleaning device 102 may identify, for the user, the circuit component across which the pressure difference does not satisfy the threshold, thereby preventing the user from performing ineffective and/or wasteful maintenance on the fiber cleaning device 102, such as replacing an air filter when the vacuum generator is malfunctioning and/or the like.

In some implementations, the fiber cleaning device 102 may include a filter bowl for receiving water that condenses in the input air filter 114 and/or the output air filter 116. For example, the compressed air supply may provide an air flow including water (e.g., in the form of humidity, water vapor, and/or the like), and the input air filter 114 and/or the output air filter 116 may filter the water out of the air flow, such that the water condenses and precipitates into the filter bowl. In some implementations, the filter bowl may include a straw extending from a top of the filter bowl into the filter bowl (e.g., to half a depth of the filter bowl, to three-quarters of the depth of the filter bowl, and/or the like), and water may precipitate from the input air filter 114 and/or the output air filter 116 through the straw into the filter bowl. By including the straw in the filter bowl, the fiber cleaning device 102 may prevent water in the filter bowl from flowing out of the filter bowl into the fiber cleaning device 102 when the unit is inverted (e.g., during transport, shipping, and/or the like).

As indicated above, FIG. 1 is provided merely as an example. Other examples are contemplated and may differ from what is described with regard to FIG. 1. For example, some implementations may include a physical differential sensor for sensing a pressure difference across a circuit component (e.g., an air filter) and for generating, based on the pressure difference, a pressure differential signal. In such an example, the controller 106 may be configured to receive the pressure differential signal and, based on the pressure differential signal, determine whether air flows satisfy thresholds, determine whether pressure differences across the circuit component satisfies a threshold, and/or perform one or more actions, such as causing messages to be displayed to a user, causing one or more valves to close, causing one or more valves to open, causing the pressure regulator 112 to be adjusted, and/or the like.

As another example, some implementations may include a controller 106 configured to receive one or more dynamic pressure signals from one or more of the pressure sensors when the fiber cleaning device 102 is performing a cleaning process and receive one or more static pressure signals from one or more of the pressure sensors when the fiber cleaning device 102 is not performing the cleaning process. The controller 106 may be configured to, based on the one or more dynamic pressure signals and the one or more static pressure signals, determine whether air flows satisfy thresholds, determine whether pressure differences between dynamic pressures (e.g., based on the one or more dynamic pressure signals) and static pressures (e.g., based on the one or more static pressure signals) satisfy thresholds, and/or perform one or more actions, such as causing messages to be displayed to a user, causing one or more valves to close, causing one or more valves to open, causing the pressure regulator 112 to be adjusted, and/or the like. In some implementations, the controller 106 may be configured to determine whether pressure differences between dynamic pressures and static pressures satisfy thresholds by comparing the pressure differences and historical data (e.g., a historical baseline, a lookup table, and/or the like).

Figure 2:
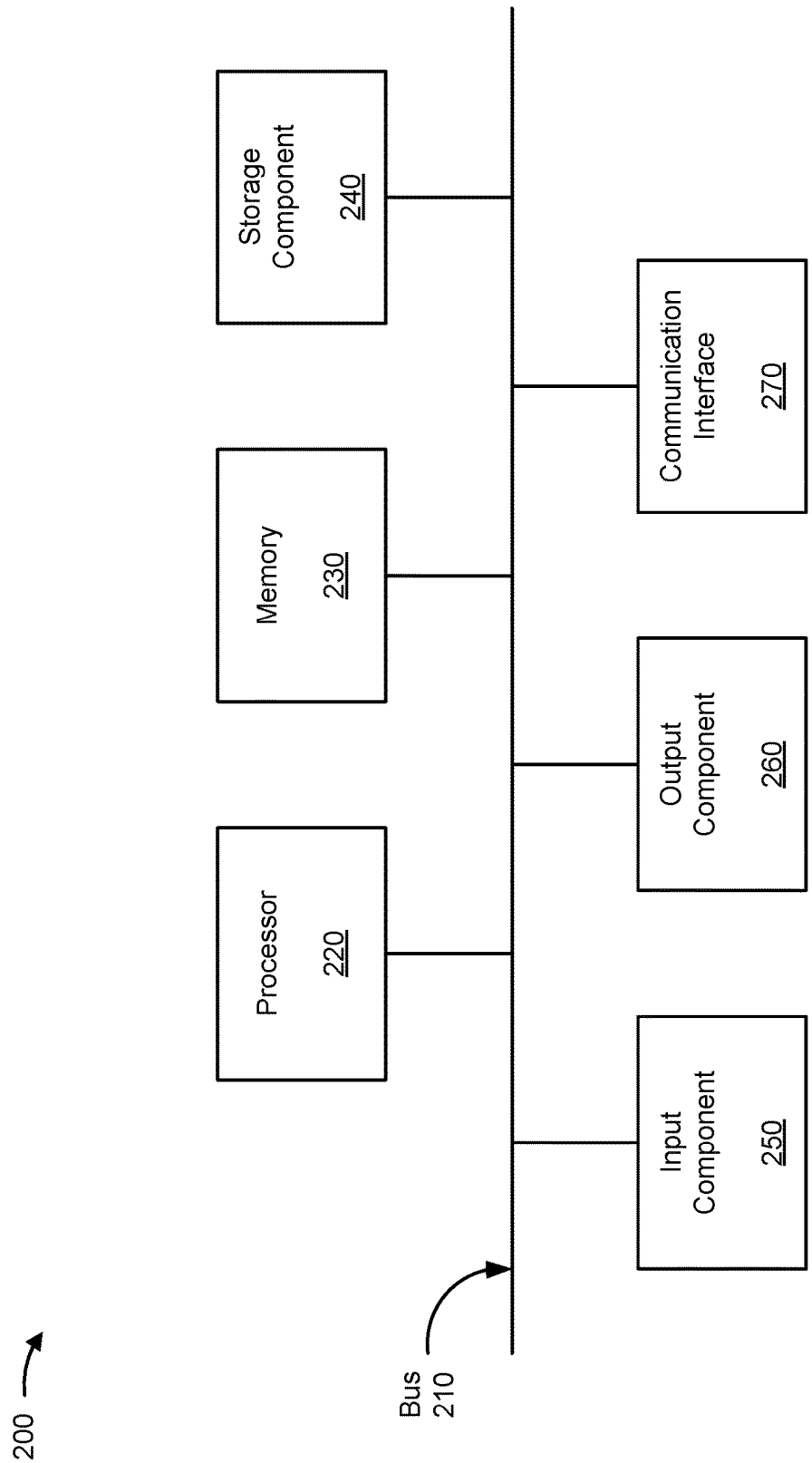
FIG. 2 is a diagram of example components of one or more devices of FIG. 1.

FIG. 2 is a diagram of example components of a device 200. Device 200 may correspond to fiber cleaning device 102. In some implementations, fiber cleaning device 102 may include one or more devices 200 and/or one or more components of device 200. As shown in FIG. 2, device 200 may include a bus 210, a processor 220, a memory 230, a storage component 240, an input component 250, an output component 260, and a communication interface 270.

Bus 210 includes a component that permits communication among multiple components of device 200. Processor 220 is implemented in hardware, firmware, and/or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 250 includes a component that permits device 200 to receive information, such as via user input (e.g., a touch screen display, a keyboard, a keypad, a mouse, a button, a switch, and/or a microphone). Additionally, or alternatively, input component 250 may include a component for determining location (e.g., a global positioning system (GPS) component) and/or a sensor (e.g., an accelerometer, a gyroscope, an actuator, another type of positional or environmental sensor, and/or the like). Output component 260 includes a component that provides output information from device 200 (via, e.g., a display, a speaker, a haptic feedback component, an audio or visual indicator, and/or the like).

Communication interface 270 includes a transceiver-like component (e.g., a transceiver, a separate receiver, a separate transmitter, and/or the like) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, and/or the like.

Device 200 may perform one or more processes described herein. Device 200 may perform these processes based on processor 220 executing software instructions stored by a non-transitory computer-readable medium, such as memory 230 and/or storage component 240. As used herein, the term "computer-readable medium" refers to a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
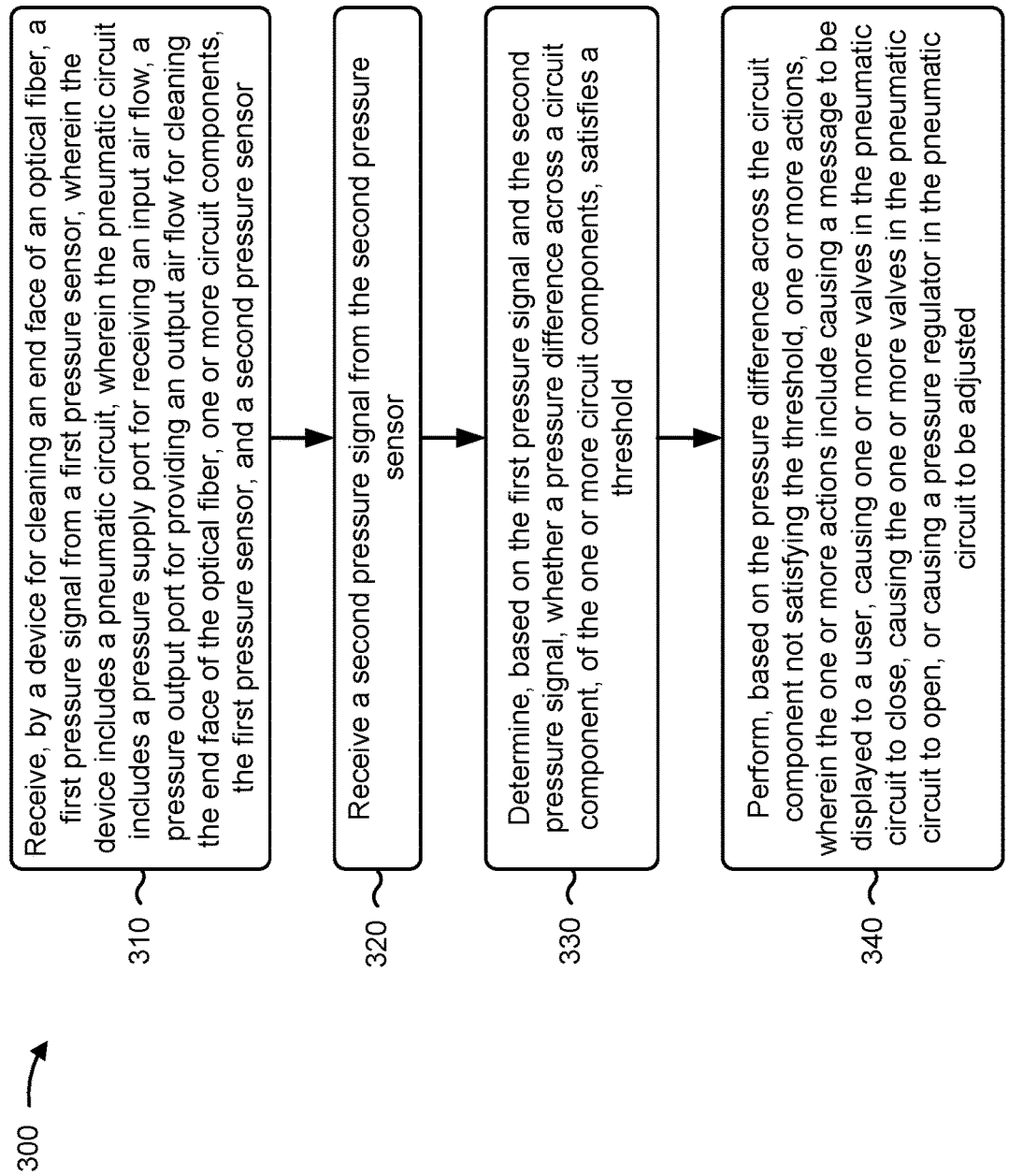
FIGS. 3 and 4 are flow charts of example processes relating to monitoring air pressure and flow in a fiber cleaning device.

FIG. 3 is a flow chart of an example process 300 relating to monitoring air pressure and flow in a fiber cleaning device. In some implementations, one or more process blocks of FIG. 3 may be performed by a device for cleaning an end face of an optical fiber (e.g., fiber cleaning device 102, device 200, and/or the like). In some implementations, one or more process blocks of FIG. 3 may be performed by another device or a group of devices separate from or including the device for cleaning an end face of an optical fiber, such as a controller (e.g., the controller 106 and/or the like), a pneumatic circuit (e.g., the pneumatic circuit 104 and/or the like), and/or the like.

As shown in FIG. 3, process 300 may include receiving, by a device for cleaning an end face of an optical fiber, a first pressure signal from a first pressure sensor, wherein the device includes a pneumatic circuit, wherein the pneumatic circuit includes a pressure supply port for receiving an input air flow, a pressure output port for providing an output air flow for cleaning the end face of the optical fiber, one or more circuit components, the first pressure sensor, and a second pressure sensor (block 310). For example, the device for cleaning an end face of an optical fiber (e.g., using controller 106, processor 220, memory 230, storage component 240, input component 250, output component 260, communication interface 270, and/or the like) may receive a first pressure signal from a first pressure sensor, as described above. In some implementations, the device includes a pneumatic circuit. In some implementations, the pneumatic circuit includes a pressure supply port for receiving an input air flow, a pressure output port for providing an output air flow for cleaning the end face of the optical fiber, one or more circuit components, the first pressure sensor, and a second pressure sensor.

As further shown in FIG. 3, process 300 may include receiving a second pressure signal from the second pressure sensor (block 320). For example, the device for cleaning an end face of an optical fiber (e.g., using controller 106, processor 220, memory 230, storage component 240, input component 250, output component 260, communication interface 270, and/or the like) may receive a second pressure signal from the second pressure sensor, as described above. In some implementations, the first pressure sensor and the second pressure sensor are positioned, in the pneumatic circuit, on opposite sides of a circuit component of the one or more circuit components.

As further shown in FIG. 3, process 300 may include determining, based on the first pressure signal and the second pressure signal, whether a pressure difference across a circuit component, of the one or more circuit components, satisfies a threshold (block 330). For example, the device for cleaning an end face of an optical fiber (e.g., using controller 106, processor 220, memory 230, storage component 240, input component 250, output component 260, communication interface 270, and/or the like) may determine, based on the first pressure signal and the second pressure signal, whether a pressure difference across a circuit component, of the one or more circuit components, satisfies a threshold, as described above.

As further shown in FIG. 3, process 300 may include performing, based on the pressure difference across the circuit component not satisfying the threshold, one or more actions, wherein the one or more actions include causing a message to be displayed to a user, causing one or more valves in the pneumatic circuit to close, causing the one or more valves in the pneumatic circuit to open, or causing a pressure regulator in the pneumatic circuit to be adjusted (block 340). For example, the device for cleaning an end face of an optical fiber (e.g., using controller 106, processor 220, memory 230, storage component 240, input component 250, output component 260, communication interface 270, and/or the like) may perform, based on the pressure difference across the circuit component not satisfying the threshold, one or more actions, as described above. In some implementations, the one or more actions include causing a message to be displayed to a user, causing one or more valves in the pneumatic circuit to close, causing the one or more valves in the pneumatic circuit to open, or causing a pressure regulator in the pneumatic circuit to be adjusted.

Process 300 may include additional implementations, such as any single implementation or any combination of implementations described below and/or in connection with one or more other processes described elsewhere herein.

In a first implementation, the circuit component comprises an air filter, and performing the one or more actions includes causing the message to be displayed to the user, wherein the message includes an indication that the air filter needs inspection.

In a second implementation, alone or in combination with the first implementation, the circuit component comprises at least one of: an air filter, a valve of the one or more valves, the pressure regulator, or a vacuum generator.

In a third implementation, alone or in combination with one or more of the first and second implementations, the circuit component is a first circuit component, the pressure difference across the first circuit component is a first pressure difference, the threshold is a first threshold, and process 300 further includes: receiving a third pressure signal from a third pressure sensor, wherein the second pressure sensor and the third pressure sensor are positioned, in the pneumatic circuit, on opposite sides of a second circuit component of the one or more circuit components, determining, based on the second pressure signal and the third pressure signal, whether a second pressure difference across the second circuit component satisfies a second threshold, and performing, based on the second pressure difference across the second circuit component not satisfying the second threshold, at least one of the one or more actions.

In a fourth implementation, alone or in combination with one or more of the first through third implementations, the circuit component is a vacuum generator, the pneumatic circuit includes a valve, of the one or more valves, positioned between the pressure supply port and the vacuum generator, process 300 further includes causing the valve to open, and performing the one or more actions includes: causing, after causing the valve to open and based on the pressure difference across the vacuum generator not satisfying the threshold, the message to be displayed to the user.

In a fifth implementation, alone or in combination with one or more of the first through fourth implementations, process 300 includes receiving, at the pressure supply port, the input air flow; and providing, via the pressure output port, the output air flow to the end face of the optical fiber.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
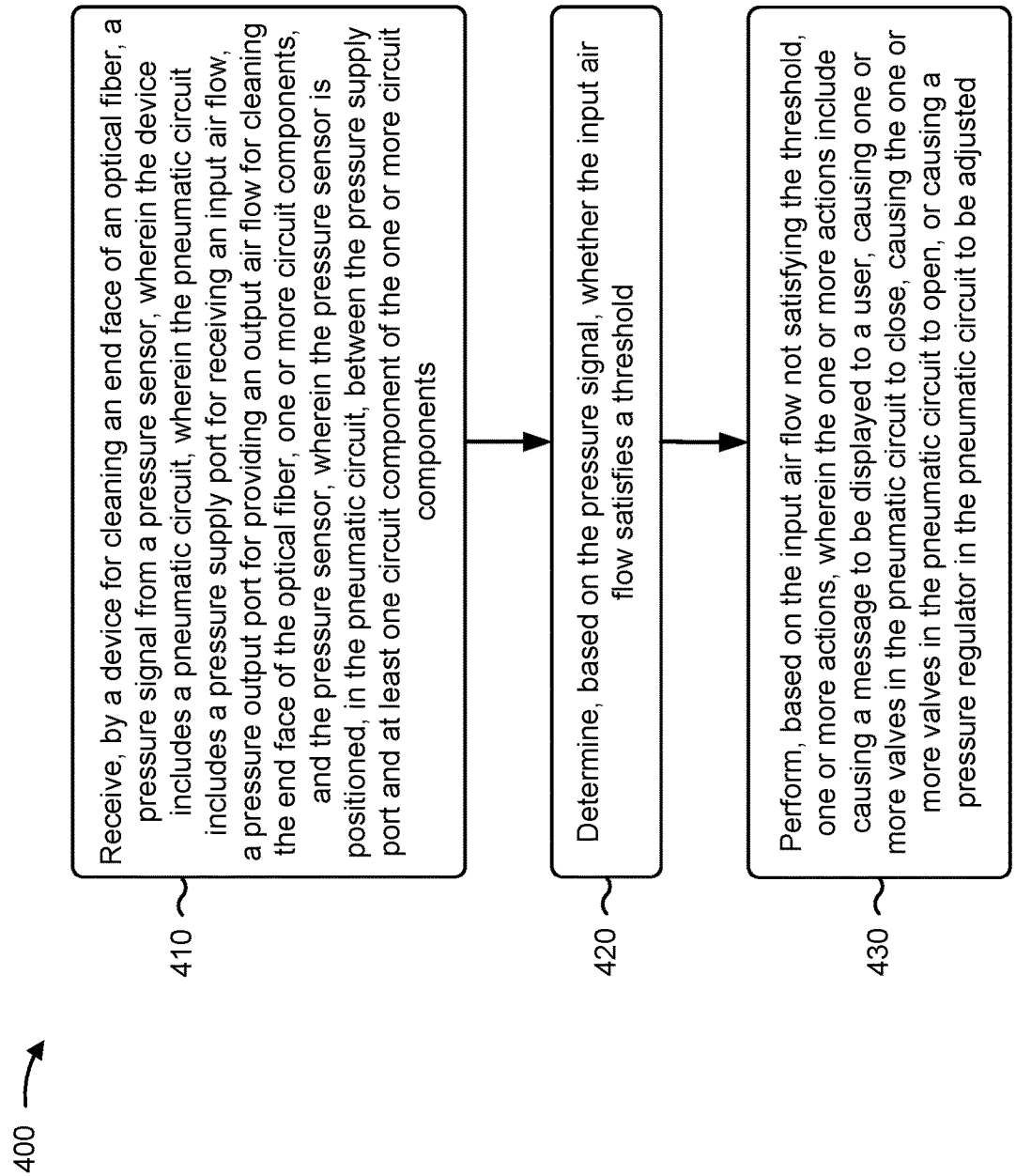

FIG. 4 is a flow chart of an example process 400 associated with monitoring air pressure and flow in a fiber cleaning device. In some implementations, one or more process blocks of FIG. 4 may be performed by a device for cleaning an end face of an optical fiber (e.g., fiber cleaning device 102, device 200, and/or the like). In some implementations, one or more process blocks of FIG. 3 may be performed by another device or a group of devices separate from or including the device for cleaning an end face of an optical fiber, such as a controller (e.g., the controller 106 and/or the like), a pneumatic circuit (e.g., the pneumatic circuit 104 and/or the like), and/or the like.

As shown in FIG. 4, process 400 may include receiving, by a device for cleaning an end face of an optical fiber, a pressure signal from a pressure sensor, wherein the device includes a pneumatic circuit, wherein the pneumatic circuit includes a pressure supply port for receiving an input air flow, a pressure output port for providing an output air flow for cleaning the end face of the optical fiber, one or more circuit components, and the pressure sensor, wherein the pressure sensor is positioned, in the pneumatic circuit, between the pressure supply port and at least one circuit component of the one or more circuit components (block 410). For example, the device for cleaning an end face of an optical fiber (e.g., using controller 106, processor 220, memory 230, storage component 240, input component 250, output component 260, communication interface 270, and/or the like) may receive a pressure signal from a pressure sensor, as described above. In some implementations, the device includes a pneumatic circuit. In some implementations, the pneumatic circuit includes a pressure supply port for receiving an input air flow, a pressure output port for providing an output air flow for cleaning the end face of the optical fiber, one or more circuit components, and the pressure sensor. In some implementations, the pressure sensor is positioned, in the pneumatic circuit, between the pressure supply port and at least one circuit component of the one or more circuit components.

As further shown in FIG. 4, process 400 may include determining, based on the pressure signal, whether the input air flow satisfies a threshold (block 420). For example, the device for cleaning an end face of an optical fiber (e.g., using controller 106, processor 220, memory 230, storage component 240, input component 250, output component 260, communication interface 270, and/or the like) may determine, based on the pressure signal, whether the input air flow satisfies a threshold, as described above.

As further shown in FIG. 4, process 400 may include performing, based on the input air flow not satisfying the threshold, one or more actions, wherein the one or more actions include causing a message to be displayed to a user, causing one or more valves in the pneumatic circuit to close, causing the one or more valves in the pneumatic circuit to open, or causing a pressure regulator in the pneumatic circuit to be adjusted (block 430). For example, the device for cleaning an end face of an optical fiber (e.g., using controller 106, processor 220, memory 230, storage component 240, input component 250, output component 260, communication interface 270, and/or the like) may perform, based on the input air flow not satisfying the threshold, one or more actions, as described above. In some implementations, the one or more actions include causing a message to be displayed to a user, causing one or more valves in the pneumatic circuit to close, causing the one or more valves in the pneumatic circuit to open, or causing a pressure regulator in the pneumatic circuit to be adjusted.

Process 400 may include additional implementations, such as any single implementation or any combination of implementations described below and/or in connection with one or more other processes described elsewhere herein.

In a first implementation, the message includes at least one of: a first indication that a pressure of the input air flow is low, or a second indication that a volumetric flow rate of the input air flow is low.

In a second implementation, alone or in combination with the first implementation, the pressure sensor is a first pressure sensor, the pressure signal from the first pressure sensor is a first pressure signal, the threshold is a first threshold, the pneumatic circuit includes a second pressure sensor, the first pressure sensor and the second pressure sensor are positioned on opposite sides of a circuit component of the one or more circuit components, and process 400 further includes: receiving a second pressure signal from the second pressure sensor, determining, based on the first pressure signal and the second pressure signal, whether a pressure difference across the circuit component satisfies a second threshold, and performing, based on the pressure difference across the circuit component not satisfying the second threshold, at least one of the one or more actions.

In a third implementation, alone or in combination with one or more of the first and second implementations, the circuit component is an air filter.

In a fourth implementation, alone or in combination with one or more of the first through third implementations, the circuit component is a first circuit component, the pressure difference across the first circuit component is a first pressure difference, the pneumatic circuit includes: a second circuit component of the one or more circuit components, and a third pressure sensor, the second pressure sensor and the third pressure sensor are positioned on opposite sides of the second circuit component, and process 400 further includes: receiving a third pressure signal from the third pressure sensor, determining, based on the second pressure signal and the third pressure signal, whether a second pressure difference across the second circuit component satisfies a third threshold, and performing, based on the second pressure difference across the second circuit component not satisfying the second threshold, at least one of the one or more actions.

In a fifth implementation, alone or in combination with one or more of the first through fourth implementations, the second circuit component comprises at least one of an air filter, a valve of the one or more valves, the pressure regulator, or a vacuum generator.

In a sixth implementation, alone or in combination with one or more of the first through fifth implementations, the device further comprises a vacuum port and a vacuum generator for providing, at the vacuum port, a vacuum for cleaning the end face of the optical fiber, and process 400 further comprises providing, via the vacuum port, the vacuum to the end face of the optical fiber.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device for cleaning an end face of an optical fiber, a first pressure signal from a first particular pressure sensor of a plurality of pressure sensors, wherein the device includes a pneumatic circuit comprising:
      a pressure supply port for receiving an input air flow,
      a pressure output port for providing an output air flow for cleaning the end face of the optical fiber,
      a plurality of circuit components, comprising:
         an input air filter configured to receive the input air flow from the pressure supply port,
         a pressure regulator configured to receive the input air flow from the input air filter and regulate a pressure of the input air flow, and
         an output air filter configured to receive the input air flow from the pressure regulator, and
      a plurality of pressure sensors, comprising:
         a first pressure sensor connected to, and positioned between, the pressure supply port and a first side of the input air filter,
         a second pressure sensor connected to, and positioned between, a second side of the input air filter, opposite of the first side of the input air filter, and a first side of the pressure regulator,
         a third pressure sensor connected to, and positioned between, a second side of the pressure regulator opposite, opposite of the first side of the pressure regulator, and a first side of the output air filter, and
         a fourth pressure sensor connected to, and positioned between, a second side of the output air filter, opposite of the first side of the output air filter, and the pressure output port;
   receiving, by the device, a second pressure signal from a second particular pressure sensor of the plurality of pressure sensors;

determining, by the device and based on the first pressure signal and the second pressure signal, whether a pressure difference across a particular circuit component, of the plurality of circuit components, satisfies a threshold; and performing, by the device and based on whether the pressure difference across the particular circuit component satisfies the threshold, one or more actions associated with correcting a problem associated with the device, wherein performing the one or more actions comprises:
causing one or more valves in the pneumatic circuit to close,
causing the one or more valves to open, or
causing the pressure regulator in the pneumatic circuit to be adjusted.

2. The method of claim 1, wherein performing the one or more actions further comprises:
causing a message, to be displayed to a user, that includes an indication that at least one of the input air filter or the output air filter needs inspection.

3. The method of claim 1, wherein the pneumatic circuit further comprises the one or more valves.

4. The method of claim 1, further comprising:
receiving, at the pressure supply port, the input air flow; and
providing, via the pressure output port, the output air flow to the end face of the optical fiber.

5. A method, comprising:
receiving, by a device for cleaning an end face of an optical fiber, a pressure signal from a first particular pressure sensor of a plurality of pressure sensors,
wherein the device includes a pneumatic circuit comprising:
a pressure supply port for receiving an input air flow,
a pressure output port for providing an output air flow for cleaning the end face of the optical fiber,
a plurality of circuit components, comprising:
a pressure regulator,
an output air filter,
a vacuum port, and
a vacuum generator in communication with the vacuum port, and
a plurality of pressure sensors, comprising:
a first pressure sensor connected to, and positioned between, the pressure supply port and a first side of the pressure regulator,
a second pressure sensor connected to, and positioned between, a second side of the pressure regulator, opposite of the first side of the pressure regulator, and a first side of the output air filter, wherein the second pressure sensor is further connected to the vacuum generator, and
a third pressure sensor connected to, and positioned between, a second side of the output air filter, opposite of the first side of the output air filter, and the pressure output port;
determining, by the device and based on the pressure signal, whether the input air flow satisfies a threshold; and
performing, by the device and based on whether the input air flow satisfies the threshold, one or more actions associated with correcting a problem associated with the device,
wherein performing the one or more actions comprises:
causing one or more valves in the pneumatic circuit to close,
causing the one or more valves to open, or
causing the pressure regulator in the pneumatic circuit to be adjusted.

6. The method of claim 5, wherein performing the one or more actions further comprises:
causing a message, to be displayed to a user, that includes at least one of:
a first indication that a pressure of the input air flow is low, or
a second indication that a volumetric flow rate of the input air flow is low.

7. The method of claim 5, further comprises;
providing, via the vacuum port, a vacuum to the end face of the optical fiber.

8. A device for cleaning an end face of an optical fiber, the device comprising:
a pneumatic circuit including:
a pressure supply port for receiving an input air flow,
a pressure output port for providing an output air flow for cleaning the end face of the optical fiber,
a plurality of circuit components, comprising:
an input air filter configured to receive the input air flow from the pressure supply port,
a pressure regulator configured to receive the input air flow from the input air filter and regulate a pressure of the input air flow, and
an output air filter configured to receive the input air flow from the pressure regulator, and
a plurality of pressure sensors, comprising:
a first pressure sensor connected to, positioned between, the pressure supply port and a first side of the input air filter,
a second pressure sensor connected to, and positioned between, a second side of the input air filter, different from the first side of the input air filter, and a first side of the pressure regulator,
a third pressure sensor connected to, and positioned between, a second side of the pressure regulator opposite, opposite of the first side of the pressure regulator, and a first side of the output air filter, and
a fourth pressure sensor connected to, and positioned between, a second side of the output air filter, opposite of the first side of the output air filter, and the pressure output port; and
a controller, configured to:
receive, from a first particular pressure sensor of the plurality of pressure sensors, a first pressure signal,
receive, from a second particular pressure sensor of the plurality of pressure sensors, a second pressure signal,
determine at least one:
whether the input air flow satisfies a first threshold based on the first pressure signal,
whether a pressure difference across a particular circuit component, of the plurality of circuit components, satisfies a second threshold, and
perform, based on at least one of whether the input air flow satisfies the first threshold or whether the pressure difference across the particular circuit component satisfies the second threshold, one or more actions associated with correcting a problem associated with the device,
wherein performing the one or more actions comprises:
causing one or more valves in the pneumatic circuit to close, causing the one or more valves to open, or
causing a pressure regulator in the pneumatic circuit to be adjusted.

9. The device of claim 8, wherein the plurality of circuit components further comprises a vacuum generator, wherein the particular circuit component is a vacuum generator, wherein the one or more valves comprises a valve positioned between the third pressure sensor and the vacuum generator,
wherein, to perform the one or more actions, the controller is configured to:
cause the valve to open, and
cause, after causing the valve to open and based on whether the pressure difference across the vacuum generator satisfying the second threshold, a message, associated with the vacuum generator, to be displayed to a user.

10. The device of claim 8, wherein the plurality of circuit components further comprises a vacuum generator, wherein the one or more valves comprises:
a first valve, connected to the vacuum generator and the third pressure sensor, for controlling air flow to the vacuum generator,
a second valve positioned between the fourth pressure sensor and the pressure output port, and
wherein, to perform the one or more actions, the controller is configured to:
cause at least one of the first valve or the second valve to open or close.

11. The device of claim 10, wherein the plurality of pressure sensors further comprises a fifth pressure sensor connected to, and positioned between, a vacuum port and the vacuum generator, wherein the pressure difference is a first pressure difference,
wherein, to cause the at least one of the first valve or the second valve to open or close, the controller is configured to:
cause the second valve to open, and
wherein the controller is further configured to:
receive a third pressure signal from the fifth pressure sensor,
determine, based on the third pressure signal and the second pressure signal, whether a second pressure difference across the vacuum generator and the second valve satisfies a third threshold, and
perform, based on causing the second valve to open and the second pressure difference across the vacuum generator not satisfying the third threshold, at least one of the one or more actions.

12. The method of claim 1, wherein the first particular pressure sensor is the first pressure sensor, and wherein the second particular pressure sensor is the second pressure sensor.

13. The method of claim 1, wherein at least one of the input air filter or the output air filter is configured to filter water out of the input air flow.

14. The method of claim 1, further comprising:
monitoring at least one of the first particular pressure sensor or the second particular pressure sensor in real time.

15. The method of claim 5, wherein the first particular pressure sensor is only one of the first pressure sensor, the second pressure sensor, or the third pressure sensor.

16. The method of claim 15, wherein the first particular pressure sensor is the third pressure sensor, and wherein performing the one or more actions comprises causing the one or more valves to close or open.

17. The method of claim 15, wherein the first particular pressure sensor is the third pressure sensor, and wherein the one or more valves is between the third pressure sensor and the vacuum generator.

18. The device of claim 8, wherein the controller is separate from the pneumatic circuit.

19. The device of claim 8, wherein the controller is further configured:
cause, based on whether the pressure difference across the particular circuit component satisfies the first threshold, a message to be displayed on the device specifying the particular circuit component.

20. The device of claim 19, wherein the message includes at least one of:
a first indication that a pressure of the input air flow is low,
a second indication that a volumetric flow rate of the input air flow is low, or
a third indication that the particular circuit component needs maintenance.

* * * * *